Sept. 7, 1943. B. S. OBERLINK 2,328,838
MOWER
Filed Jan. 15, 1941 5 Sheets-Sheet 1

Inventor
B. S. Oberlink.
by W. Gierule
Attorney

Sept. 7, 1943. B. S. OBERLINK 2,328,838
MOWER
Filed Jan. 15, 1941 5 Sheets-Sheet 2

Inventor
B. S. Oberlink
by W. Bierolf
Attorney

Sept. 7, 1943.          B. S. OBERLINK                2,328,838
                           MOWER
                    Filed Jan. 15, 1941              5 Sheets-Sheet 3

Inventor
B. S. Oberlink
by
Attorney

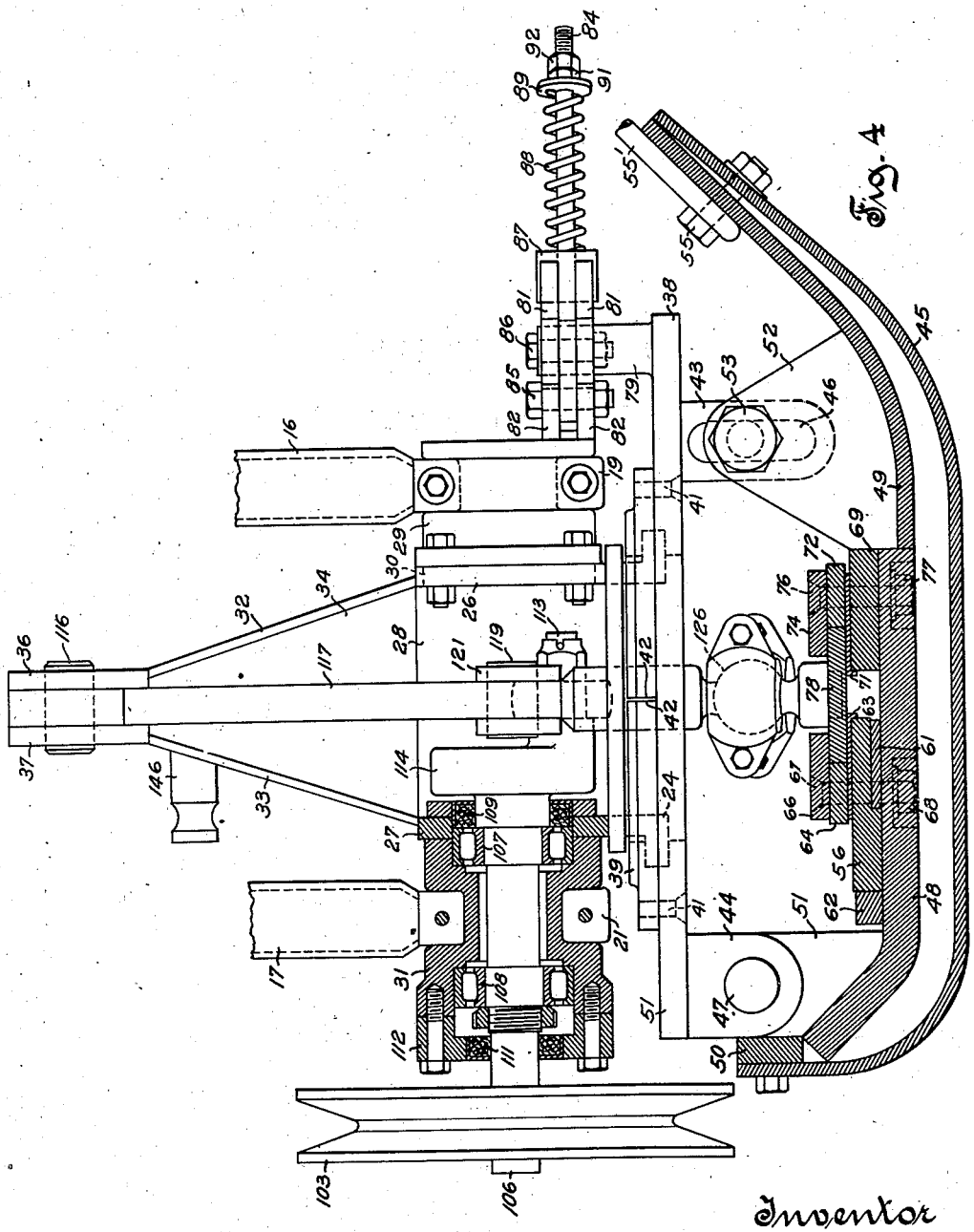

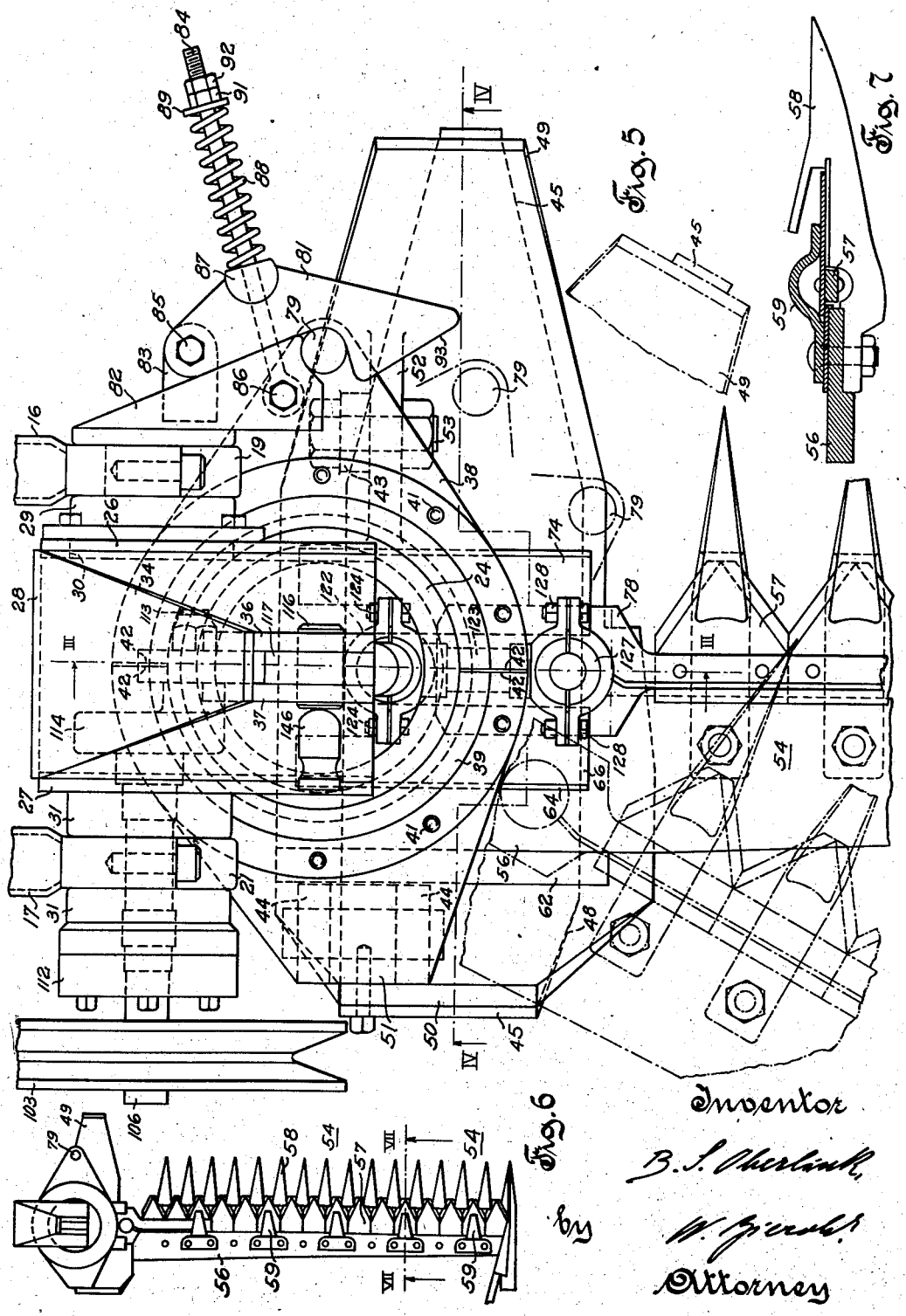

Patented Sept. 7, 1943

2,328,838

UNITED STATES PATENT OFFICE 2,328,838

MOWER

Boyd S. Oberlink, Milwaukee, Wis., assignor to Allis-Chalmers Manufacturing Company, Milwaukee, Wis., a corporation of Delaware Application January 15, 1941, Serial No. 374,426

14 Claims. (Cl. 56—25)

The invention relates to mowing machines and it has for its principal object the provision of an improved machine for cutting vegetation along the sides of a street or a highway.

More specifically, it is an object of the invention to provide an improved tractor mower of the cutter bar type which may be operated to cut on level ground as well as on an upward or downward incline at the side of the tractor, the range of vertical adjustment of the cutter bar being preferably such that it may be raised to a vertical transport position; in which the knife bar is reciprocated with a full stroke throughout said range of vertical adjustment of the cutter bar; in which the cutter bar may be adjusted from a position in which it rests on the ground to an elevated position parallel with the ground; in which the cutter bar may be tilted about an axis extending longitudinally thereof for the purpose of adjusting the cutting height when the cutter bar rides on the ground; in which the cutter bar may break back from its cutting position transversely of the tractor if it encounters an obstruction, such as a large stone or a tree stump hidden in the grass; and in which the drive mechanism for the knife bar remains connected with the knife bar and continues to operate during said break-back movement of the cutter bar.

A further object of the invention is to provide an improved mower head which is constructed to afford the mentioned vertical adjustment and break-back movement of the cutter bar, and the mentioned full stroke of the knife bar throughout the range of said vertical adjustment of the cutter bar, and which mower head also provides for the mentioned ability of the knife bar drive to remain connected with the knife bar and to continue to operate during said break-back movement of the cutter bar.

A further object of the invention is to provide a mower head of the mentioned character in which the driving mechanism for the knife bar is substantially shielded by the frame structure of the head.

A still further object of the invention is to provide a compact and sturdy mower head which operates efficiently and which is capable of severe usage, as in a highway mower, without undue wear.

The foregoing and other objects and advantages of the invention and the operation of a device constructed in accordance therewith will be apparent from the following description of a preferred embodiment of the invention. Referring to the accompanying drawings forming part of this specification and in which like reference characters designate the same or similar parts in the various views.

Figure 1:
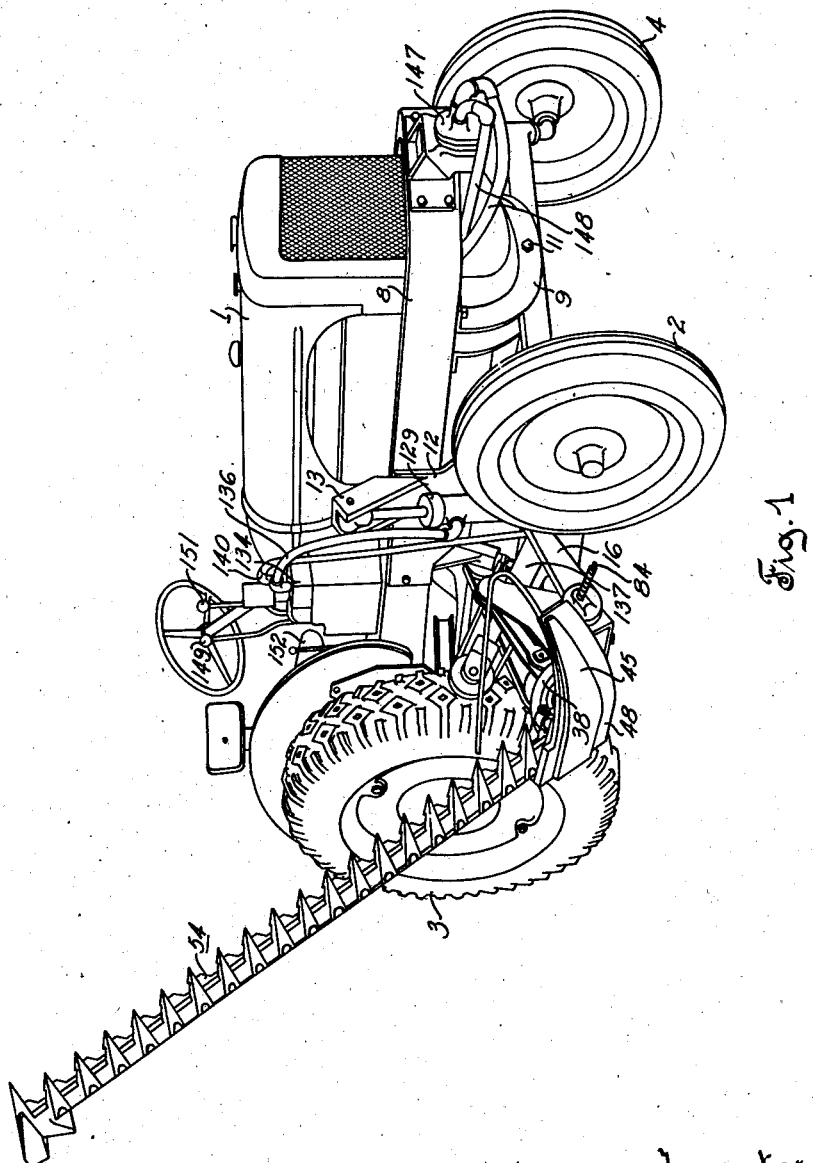
Fig. 1 is a perspective view of a tractor mower with the cutter bar adjusted to a raised position for cutting on an incline laterally of the tractor.
Figure 2:
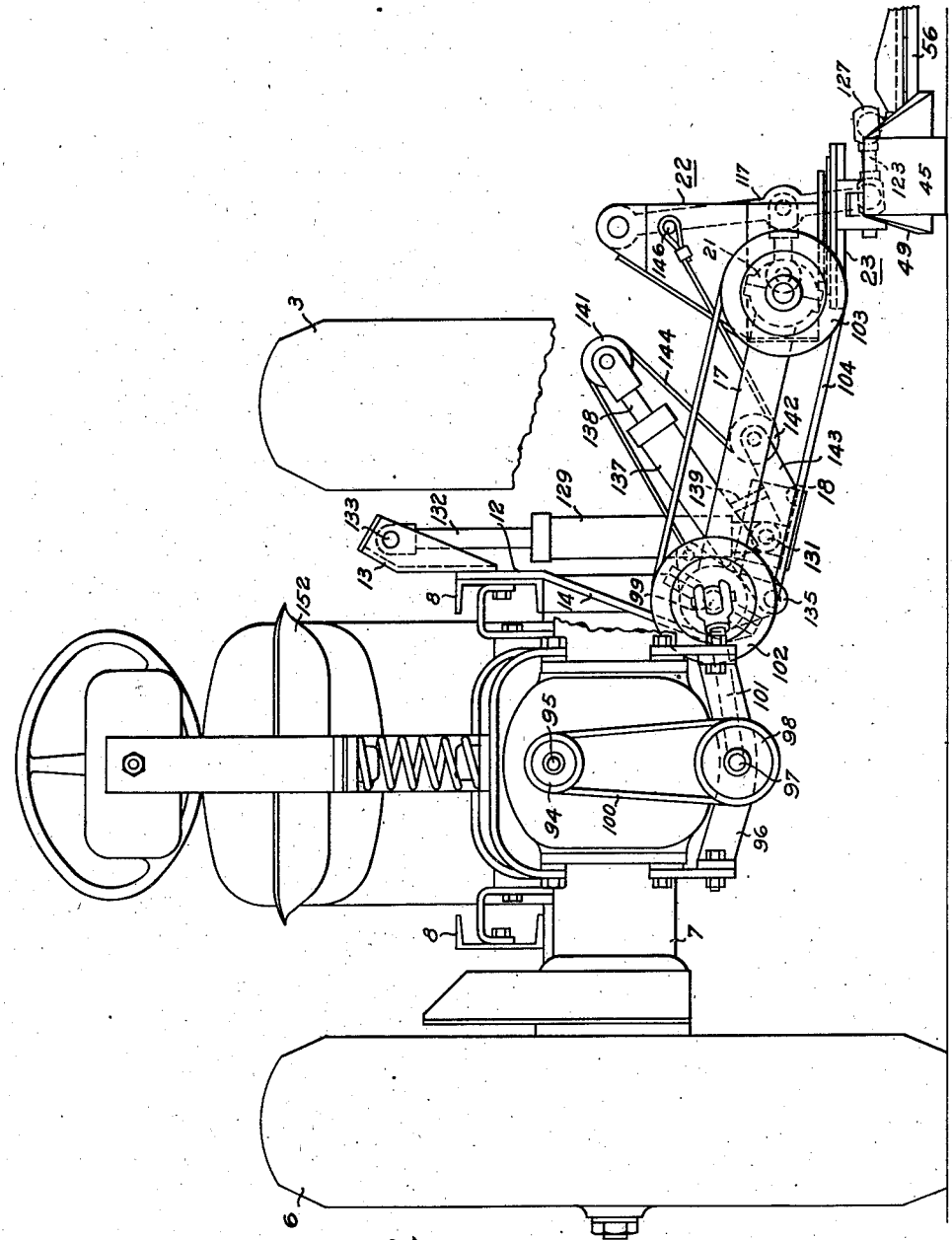
Fig. 2 is a rear view of the machine shown in Fig. 1 with the cutter bar adjusted to a horizontal position, part of the tractor being broken away to expose details of the mowing attachment.
Figure 3:
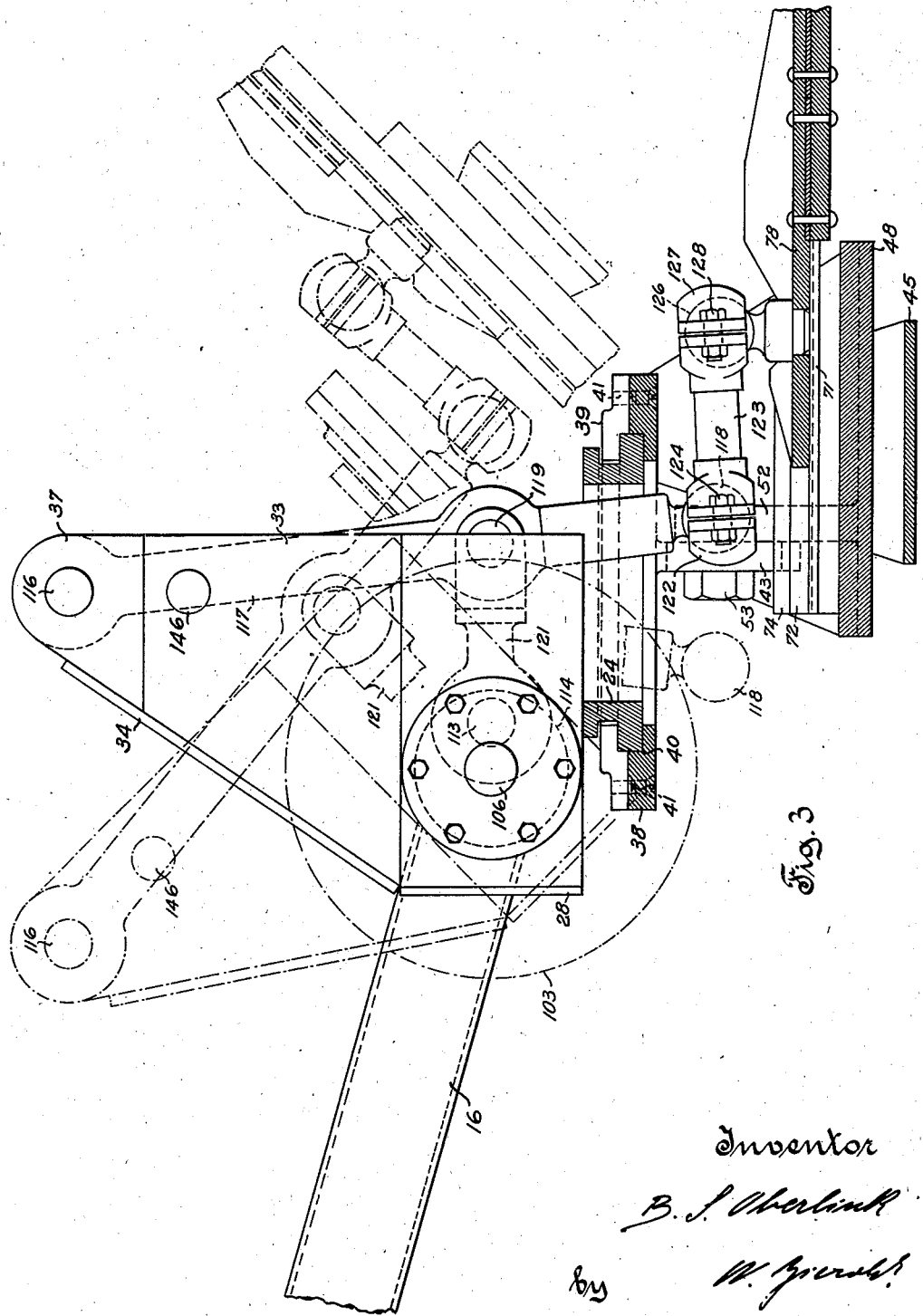

Fig. 3 is an enlarged rear view, partly in section, of the mower head and associated parts shown in Figs. 1 and 2, the lower section of the mower head being shown in section on line III—III of Fig. 5. The mower head is shown in two positions, one in full lines, which corresponds to the position in which the mower head is shown in Fig. 2; and the other in dash-dotted lines, which corresponds approximately to the position in which the mower head is shown in Fig. 1;

Fig. 4 is a side view, partly in section, of the mower head and associated parts shown in Fig. 3, the view being taken from the outer end of the cutter bar towards the tractor; and the inner cutter bar shoe being shown in section on line IV—IV of Fig. 5;

Fig. 5 is a top view of the mower head and associated parts shown in Figs. 3 and 4, the mower head being shown in full lines in a normal working position in which the cutter bar extends transversely of the tractor, and in dash-dotted lines in a partly broken-back position to which it may move when the cutter bar is driven against an obstruction;

Fig. 6 is a detail view of the cutter bar; and

Fig. 7 is a section on line VII—VII of Fig. 6.

Fig. 1 of the drawings shows a tractor mower comprising a wheel type tractor and a mowing attachment mounted thereon for cutting grass or similar vegetation at the right side of the tractor. The tractor comprises a body generally indicated by the reference character 1 which is supported at opposite sides on front and rear wheels, the front and rear wheels at the right side of the tractor being indicated by the reference characters 2 and 3, respectively. The front and rear wheels at the left side of the tractor are axially alined with the front and rear wheels at the right side of the tractor, the left front wheel being shown in Fig. 1 and indicated by the reference character 4 and the left rear wheel shown in Fig. 2 and indicated by the reference character 6. The rear wheels 3 and 6 are arranged in tracking relation to the front wheels 2 and 4, as usual.

The body of the tractor comprises a rear axle structure 7 indicated in Fig. 2 on which the rear wheels 3 and 6 are mounted, and a conventional power unit and transmission mechanism are arranged in front of the rear axle structure as may be seen from Fig. 1. The body of the tractor also includes a U-shaped frame 8 which is secured at its rear end to the rear axle structure 7 and which is supported on the axle of the front wheels by means of a U-shaped support 9 which is pivoted to the front axle at 11.

Mounted on the U-shaped frame 8 at the right side of the tractor is a bracket 12 which has an upwardly and outwardly extending arm 13 and a downwardly and inwardly extending portion 14 as best shown in Fig. 2.

Pivotally mounted at the lower end of the downwardly extending portion 14 of the bracket 12 is a drag frame comprising a pair of arms 16 and 17 which are rigidly connected with each other by a web 18 shown in Fig. 2. The arms 16 and 17 are supported at their inner ends on suitable bearings of the bracket portion 14 for swinging movement about a horizontal axis extending longitudinally of the tractor. The arms 16 and 17 terminate at their outer ends, remote from their pivotal connections with the lower bracket portion 14, in semicircular bearing portions, and bearing caps 19 and 21 are secured to the semicircular bearing portions to form a pair of cylindrical journal bearings at the outer ends of the drag frame arms 16 and 17.

Pivotally mounted in the journal bearings at the outer ends of the drag frame arms 16 and 17 is a mower head which is constructed in two sections, namely, an upper one generally indicated by the reference character 22 in Fig. 2 and a lower section generally indicated by the reference character 23 in Fig. 2. Referring to Fig. 3, the upper head section 22 comprises a ring 24 which has an outer circumferential groove and flat upper and lower surfaces. The ring 24 is rigidly secured, as by welding, to a pair of side plates 26 and 27 which are parallel to a plane extending transversely of the tractor through the axis of the ring 24 and are equally spaced from said plane at opposite sides of the latter. The side plates 26 and 27 are connected together at their ends facing the tractor by a cross-plate 28. A forward supporting trunnion 29 is bolted to the forward side plate 26 of the upper head section in offset relation to the axis of the ring 24, the axis of the forward supporting trunnion 29 extending at right angles to the mentioned transverse plane through the axis of the ring 24. The trunnion 29 is centered in an opening 30 of the plate 26. A rearward supporting trunnion 31 is rigidly secured to the rearward side plate 27 in axial alinement with the forward supporting trunnion 29, and the two trunnions are journaled in the mentioned journal bearings at the outer ends of the drag frame arms 16 and 17, and are retained against axial displacement relative thereto by suitable shoulders as shown in Fig. 4. Rising upwardly from the side plates 26 and 27 at opposite sides of the mentioned transverse plane through the axis of the ring 24 and converging towards each other are two plate members 32 and 33, these plates being connected along their edges facing the tractor by a triangular plate 34, the plate 34 being preferably welded to the converging plates 32 and 33 and extending beyond the upper edges of these plates, as best shown in Fig. 3. A pair of bearing plates 36 and 37 are disposed parallel to the mentioned transverse plane through the axis of the ring 24 at the upper ends of the converging side plates 32 and 33 and are secured in position by welded connections with these side plates and with the upward extension of the rear plate 34.

The lower section of the mower head comprises a plate member 38 which extends in a plane parallel to the plane of the ring 24, the outline of the plate 38 being best shown in Fig. 5. As shown in this figure, the plate 38 has a central portion underlying the ring 24, and forwardly and rearwardly tapering portions at diametrically opposite sides of the ring 24, the forwardly tapering portion being rounded at its forward extremity and the rearwardly tapering portion being squared off by a straight edge. The plate 38 has a circular aperture concentric with the ring 24, and a circular shoulder 40 (Fig. 3) formed by an annular recess in its upper side which annular recess accommodates a portion of the ring 24 at the lower side thereof, as shown in Fig. 3. In order to retain the plate 38 on the ring 24, a retaining ring 39 is secured to the upper side of the plate 38 by an annular series of bolts 41. The retaining ring 39 projects into the outer circumferential groove of the ring 24, and for purposes of assembly this ring is made in two halves, as shown in Fig. 5, relatively adjacent face portions 42 of the ring halves being slightly spaced from and extending parallel to each other. Secured to the tapering forward and rearward portions of the plate 38 and forming part of the lower head section are two hangers 43 and 44, (Fig. 4), the front hanger 43 consisting of a plate member depending from the lower side of the plate 38 and having a slotted opening 46, and the rear hanger 44 comprising two lugs depending from the plate 38 and forming a support for a pivot pin 47.

It will be noted that the rings 24 and 39 constitute a ring joint which connects the upper and lower head sections for rotation relative to each other and which affords a passage between the head sections axially of the ring joint. The ring joint also functions to center the aperture of the lower head section on the axis of the ring 24.

Mounted on the front and rear hangers 43 and 44 of the lower head section is an inner cutter bar shoe in the form of a fabricated structure, the shoe comprising a heavy plate section 48 and a lighter plate section 49 forwardly of the plate section 48. The rear end of the heavier plate section 48 is curved upwardly and carries a lug 51 which is pivotally secured between the lugs of the rear hanger 44 by means of the pivot pin 47. The lighter shoe plate 49 is also curved upwardly and carries a lug 52 which in turn is secured to the front hanger 43 by means of a bolt connection 53. The bolt connection 53 consists of a bolt and a nut thereon, the bolt extending through a hole in the lug 52 and through the slotted aperture 46 of the front hanger 43, and the nut being tightened on the bolt so as to retain the lug 52 firmly in contact with front hanger 43. The shoe may be tiltably adjusted relative to the lower section about the center of the pivot pin 47 after loosening the bolt connection, and after the adjustment has been made the bolt connection is again tightened to retain the shoe in adjusted position relative to the lower head section.

The cutting arm of the mower, which is generally indicated in Fig. 1 by the reference character 54, comprises a cutter bar 56, best shown in Fig. 6, and a knife bar 57, which is mounted on the cutter bar in conventional manner for reciprocating movement longitudinally thereof. Guard fingers 58 secured to the cutter bar provide suitable cutting edges for cooperation with the knives of the knife bar, and arched retainers 59 are secured to the cutter bar and project over the knives of the knife bar, as best shown in Fig. 7, to insure proper cooperation of the knives with the guard fingers. The outer end of the mower arm is provided with the usual outer shoe and swathboard, as may be seen from Figs. 1 and 6.

A wear plate 45 underlying the shoe sections 48 and 49 of the inner shoe has an upturned rearward portion which is secured by a bolt connection to a block 50 on the rear lug 51 of the shoe. An upturned forward portion of the wear plate 45 is secured to the forward portion of the shoe section 49 by another bolted connection 55 which also retains a grass rod 55' in position on the shoe.

The inner end of the cutter bar 56 extends over the plate section 48 of the shoe and is rigidly secured thereto in the following manner. As shown in Fig. 4, the underside of the cutter bar 56 has a milled out longitudinal recess, and a key plate 61 which is rigidly secured to the top of the plate section 48 is received within the recess at the underside of the cutter bar 56. A back strap 62 adjacent to the vertical rear face of the cutter bar 56 is also rigidly secured to the plate section 48, and the cutter bar is thus retained against horizontal angular displacement relative to the plate section 48. A wear plate 63 is placed on top of the cutter bar 56, and a spacer strap 64 and a retainer strap 66 rest on top of the wear plate 63. A bolt 67 has a countersunk head in the retainer strap 66 and extends downwardly through the retainer strap, the spacer strap 64, the wear plate 63 and the key plate 61, into a countersunk opening of the shoe plate 48. A nut 68 within the countersunk portion of the opening in the shoe plate 48 is threaded upon the lower end of the bolt 67 and tightened thereon to retain the parts in assembled position, a lock washer being interposed between the nut 68 and the shoe plate 48. Additional bolts assisting the bolt 67 in retaining the parts in assembled position may be provided if necessary or desirable.

Another stack of plate members is mounted on the shoe section 48 in advance of the cutter bar 56, the forward stack of plate members comprising a bottom plate 69 corresponding in thickness to the full thickness of the cutter bar 56, a wear plate 71 corresponding to the wear plate 63, a spacer strap 72 corresponding to the spacer strap 64, and a retainer strap 74 corresponding to the retainer strap 66. A bolt 76, corresponding to the bolt 67, has a countersunk head in the retainer strap 74 and extends downwardly through the spacer strap 72, wear plate 71 and bottom plate 69 into a countersunk forward opening of the shoe plate 48. A lock washer and a nut 77 on the bolt 76 are received within the countersunk portion of the forward hole in the shoe plate 48, the nut 77 being tightened to hold the forward stack of straps together. Suitable provisions are made to secure the forward stack of plate members against angular displacement on the shoe plate 48 about the bolt 76.

The retainer straps 66 and 74 are spaced from each other, longitudinally of the shoe, a shorter distance than the spacer straps 64 and 72, and the knife bar 57 has a head plate 78 slidably fitted between the spacer straps 64 and 72. The head plate 78 rests on the wear plates 63 and 71 and is retained against upward movement by the retainer plates 66 and 74. The head plate 78 is thus guided on the inner shoe of the mower arm for reciprocating movement transversely of the inner shoe.

From the foregoing description of the connection between the cutter bar and the inner shoe it will be seen that the cutter bar is rigidly secured to the inner shoe while the knife bar is reciprocable longitudinally of the cutter bar and transversely of the shoe. The mower shoe in turn is connected to the lower section of the mower head by the rearward pivot pin 47 and the bolted connection 53 and is normally retained in fixed position on the lower section of the mower head but may be tilted, as stated, about the axis of the pivot pin 47, that is, about an axis extending longitudinally of the cutter bar. The ring joint which connects the lower head section to the upper head section permits rotary displacement of the lower head section relative to the upper head section about the axis of the ring joint, but the head sections are incapable of relative movement other than rotary movement about the axis of the ring joint.

Referring to Figs. 4 and 5, a locking pin 79 is secured in an upstanding position on the forwardly tapering portion of the lower head plate 38, as best shown in Fig. 4. As shown in Fig. 5, the locking pin 79 is engaged by a latch 81 which is pivotally mounted at 85 on a bracket secured to the forward supporting trunnion 29. The bracket for the latch 81 comprises two vertically spaced triangular plate members 82 which are welded to the front face of the supporting trunnion 29, and a supporting lug 83 is secured between the bracket plates 82 and extends forwardly therefrom in front of the supporting trunnion 29. The latch 81 comprises two vertically spaced plates in the same planes as the plates 82, and a bolt extending through the latch plates 81 and through the lug 83 provides the pivot connection 85 between the latch and its supporting bracket. The latch 81 is resiliently pressed against the locking pin 79 by a spring mechanism which comprises a long eye-bolt 84 which extends through the space between the latch plates 81 into the space between the bracket plates 82. A bolt 86 extending through the bracket plates 82 and the eye of the eye-bolt 84 secures the eye-bolt for pivotal movement on the bracket 82. Slidably fitted upon the shank of the eye-bolt 84 is a thrust block 87 which has a cylindrical surface seated in semicylindrical recesses of the latch plates 81, and a spring 88 urges the thrust block 87 into the recesses of the latch plates 81. The spring 88 bears at one end upon the thrust block 87 and at its other end against a washer 89 which abuts against a nut 91 on the threaded portion of the eye-bolt 84. A jam nut 92 is drawn up against the nut 91 to lock it on the eye-bolt 84. The tension of the spring 88 may be adjusted by means of the nuts 91 and 92.

It will be noted that the latch 81 cooperating with the locking pin 79 releasably secures the lower section of the mower head against rotation relative to the upper head section about the axis of the ring joint comprising the rings 24 and 39. It will further be noted that the lower head section is releasably locked by the latch 81 and locking pin 79 relative to the upper head section in such a position as to dispose the mower arm 54 transversely of the tractor. From the locked position of the lower head section which is shown in full lines in Fig. 5 the lower head section together with the inner shoe and cutter bar may swing about the axis of the ring joint into the dash-dotted line position indicated in Fig. 5 upon release of the latch mechanism comprising the latch plates 81 and the locking pin 79. Such movement, which is termed a break-back movement, occurs when the cutter bar in operation of the mower strikes an obstruction such as a large stone or a tree stump hidden in the grass. The break-back movement protects the machine against damage which would otherwise be caused by continued advance movement of the tractor. The tension of the spring 88 is so adjusted that the cutter bar will remain in its normal cutting position transversely of the tractor under ordinary cutting strains, but when the cutter bar encounters an obstruction while the mower is in progress, the pressure of the locking pin 79 upon the latch 81 will become sufficiently high to force the latch 81 against the pressure of the spring 88 out of engagement with the pin 79 and thus permit the cutter bar to break back. The path of movement of the locking pin 79 during the break-back movement is indicated by two dash-dotted line positions of this pin in Fig. 5. It will also be noted that during the break-back movement, the lower head section is guided upon the upper head section by the coaction of the lower head plate 38 and the ring 39 with the ring 24 of the upper head section. After the obstruction has been cleared, it is only necessary for the operator to rest the rear edge of the cutter bar against the obstruction and drive the tractor a short distance in reverse, and such rear movement of the tractor will then cause rotation of the lower head section relative to the upper head section so as to restore the cutter bar to its normal position and to reengage the latch 81 with the locking pin 79. The latch 81 has a suitable slanting surface 93 along which the locking pin 79 may slide into locking engagement with the latch 81 while the cutter bar is being restored to its normal working position.

Referring now to the mechanism for transmitting driving power to the knife bar 57, Fig. 2 of the drawings shows a power takeoff shaft 95 extending rearwardly from the rear axle housing of the tractor, and a sheave 94 mounted on said power takeoff shaft, the power takeoff shaft receiving power from the engine of the tractor in a conventional manner. Mounted below the central portion of the rear axle structure 7 is a supplemental frame 96 on which an auxiliary shaft 97 is journaled in a position below the power takeoff shaft of the tractor. The auxiliary shaft 97 carries a sheave 98, and a belt 100 trained over the sheaves 94 and 98 transmits rotation of the power takeoff shaft to the auxiliary shaft 97. The auxiliary shaft 97 extends longitudinally of the tractor and another auxiliary shaft 99 extending longitudinally of the tractor is mounted at the lower end of the bracket portion 14 for rotation about an axis coinciding with the axis on which the drag frame arms 16 and 17 are pivoted to the bracket portion 14. The auxiliary shaft 99 is drivingly connected with the auxiliary shaft 97 by an intermediate shaft 101 which has a universal joint connection at one end with the auxiliary shaft 97 and at the other end with the second auxiliary shaft 99. Mounted on the second auxiliary shaft 99 in rear of the drag frame arm 17 is a sheave 102 which is keyed to the shaft 99 and rotated by the transmission of power from the power takeoff shaft 95 to the second auxiliary shaft 99 through the first auxiliary shaft 97 and the intermediate shaft 101. From the sheave 102 power is transmitted to another sheave 103 at the outer end of the drag frame 16, 17 by means of a belt 104.

Referring to Fig. 4, it will be seen that the sheave 103 is mounted on a drive shaft 106 which is journaled within the rear supporting trunnion 31, this trunnion having an axial bore and being thus made hollow. A pair of roller bearings 107 and 108 mounted within the hollow trunnion 31 support the drive shaft 106 for rotation coaxially with the trunnion 31, the roller bearings being suitably mounted within the trunnion 31 and on the drive shaft 106 so as to retain the drive shaft 106 against axial displacement relative to the trunnion 31. An oil seal 109 adjacent to the plate 27 of the upper head section and an oil seal 111 fitted into a cap 112 at the rear end of the trunnion are provided to protect the roller bearings against dirt and to provide for the retention of lubricant within the axial bore of the trunnion 31. A crank pin 113 is secured to a flywheel portion 114 of the drive shaft 106 in the space between the side plates 26 and 27 of the upper head section overlying the apertures of the ring 24 and of the lower head plate 38. Fig. 4 shows the crank pin 113 in its lowermost position while Figs. 3 and 5 show the crank pin rotated into a horizontal plane through the drive shaft 106. The hole 30 in the side plate 26 permits passage of the shaft 106 and flywheel 114 therethrough for purposes of assembly, before installation of the trunnion 29.

In connection with the description of the upper head section it has heretofore been mentioned that a pair of bearing plates 36 and 37 are secured to the upper end of said head section. A pivot pin 116 is mounted in these bearing plates 36 and 37 on an axis parallel to the axis of the drive shaft 106, and an arm 117 is swingably mounted on the pivot pin 116 between the bearing plates 36 and 37. An eye on the arm 117 is closely fitted between the bearing plates 36 and 37, and the arm is thus retained for swinging movement transversely of the axis of the drive shaft 106. The pivot pin 116 is moreover located in such position on the upper head section that its axis lies directly above the center of the ring joint 24 and 39 or, in other words, the arm 117 is pivoted at a center on the axis of said ring joint. The arm 117 extends downwardly from the pivot pin 116 through the ring 24 into the lower head section, and a ball element 118 is formed at the lower end of the arm. An enlarged portion of the arm 117, between its upper and lower ends, carries a wrist pin 119 which extends through the arm parallel to the pin 116. The wrist pin 119 serves to connect one end of a pitman 121 to the arm, the other end of the pitman being journaled on the crank pin 113. As best shown in Fig. 4, the end of the pitman 121 connected to the arm 117 is bifurcated and the enlarged portion of the arm 117 is closely fitted between the forked arms of the pitman 121, the wrist pin 119 extending through both arms of the bifurcated portion of the pitman 121, and being suitably retained against axial displacement.

Rotation of the drive shaft 106 causes oscillatory movement of the arm 117 about its pivot center at 116, and the crank pin 113 is offset from the center of the drive shaft 106 at such a distance that its throw will oscillate the arm 117 within the limits of the ring 24. The limits of the throw at the lower end of the arm are indicated in Fig. 3 by the full line position of the arm 117 and by the dash-dotted line position of the lower arm portion at the left side of the full line position. It will be seen that the arm 117 is guided on the upper head section for swinging movement in a plane which extends transversely to the axis of the drive shaft 106, through the axis of the ring joint.

The ball element 118 at the lower end of the arm 117 is embraced by a socket 122 at one end of a link 123, the socket 122 being split and the loose half being secured to the link 123 by a pair of bolts 124. The other end of the link 123 has a ball and socket connection with the head plate 78 of the knife bar 57. A ball element 126 is supported on a base secured to the head plate 78 between the retainer plates 66 and 74, as shown in Fig. 4, and the link 123 has a split socket 127 engaging the ball 126. The cap portion of the split socket 127 embracing the ball 126 is secured to the link 123 by a pair of bolts 128. The link 123 due to its ball and socket connections with the arm 117 and the knife bar 57 transmits oscillatory movement of the arm 117 to the knife bar, and the knife bar, in the full line position of the cutter bar shown in Fig. 5, is thus reciprocated with a full cutting stroke longitudinally of the cutter bar by rotation of the shaft 106 which shaft, in turn, is driven by the power takeoff of the tractor as has been explained hereinbefore.

It will be noted that the pitman connection between the shaft 106 and the arm 117, and the arm 117 itself, are shielded by the side walls 26 and 27 and by the wall portions 32 and 33 of the upper head section, and that the wall portions 28 and 34 of the upper head section further shield the moving parts within the upper head section.

It will also be noted that the link 123 is connected to the knife bar in such a manner that a line from the pivot center 116 of the arm 117 on the upper head section, through the center of the ball and socket connection 118, 122, to the center of the ball and socket connection 126, 127 extends through the passage afforded by the ring joint comprising the rings 24 and 39. When the cutter bar breaks back, as has been mentioned hereinbefore, the line of travel of the ball 126 on the knife bar moves out of the plane of swinging movement of the arm 117 into an acute angle relation to said plane as is illustrated by the dash-dotted line position of the cutter bar in Fig. 5. During such movement the link 123 will be turned on the arm 117 about the center of the ball and socket connection at the lower end of said arm. A full cutting stroke is being transmitted, as stated, to the knife bar in the position of the cutter bar, which is shown in full lines in Fig. 5, and assuming that the arm 117 continues to oscillate during the break-back movement of the cutter bar, the stroke transmitted to the knife bar decreases as the break-back travel of the cutter bar increases. It will be seen, however, that the driving mechanism may continue to operate without binding in any way even if the cutter bar should be swung back to a position parallel to the direction of propulsion of the tractor, in which case reciprocation of the knife bar would cease entirely.

The necessary flexibility of the drive to permit its continued operation, without binding, during break-back movement of the cutter bar is accomplished by the link and its ball and socket connections with the arm 117 and the knife bar 57. It should be understood, however, that the ball and socket connections are only a preferred way of accomplishing the desired result, and that the invention is not limited to the illustrated specific construction, since other arrangements could obviously be made to accomplish the necessary flexibility of the drive. The ball and socket connections of the link 123 with the arm 117 and the knife bar 57 are considered preferable in order to insure proper operation of the drive when the cutter bar is tilted about the axis of the pivot pin 47, as has been described hereinbefore in connection with the bolt connection 53.

Fig. 1, as stated, shows the mowing arm raised to a position for cutting on an incline laterally of the tractor. From the position shown in Fig. 1, the cutter bar may be lowered to position for cutting on level ground by tilting adjustment of the upper and lower head sections on the drag arms 16 and 17, as illustrated in Fig. 3. As stated, the forward and rearward supporting trunnions 29 and 31 are journaled on the drag arms, and when the head comprising the two sections is tilted up or down on the drag arms 16 and 17 the journals 29 and 31 rotate in the bearings at the outer ends of these drag arms. During such tilting movement of the head its upper and lower sections move in unison about the axis of the drive shaft 106, and the inner shoe and the mowing arm 54 move in unison with the head. When the head is tilted in the mentioned manner, the pin 116 which constitutes the swinging center of the arm 117, and the axis of the ring joint 24, 39 remain in their predetermined relation to the axis of the drive shaft 106. It will be seen that due to this arrangement the throw of the knife bar which is transmitted thereto by the arm 117 remains unchanged irrespective of whether the cutter bar is adjusted to a horizontal cutting position or to an upwardly inclined cutting position as shown in Fig. 1. In other words, the knife bar will be reciprocated with a full cutting stroke in any position of vertical angular adjustment of the cutter bar about the axis of the trunnions 29 and 31.

It should also be noted that the mower head may be tilted from the position in which it is shown in Fig. 3, so as to raise the outer end of the cutter bar through an angle of ninety degrees or more, such tilting movement of the mower head being not obstructed by any parts of the drag frame comprising the arms 16 and 17. Nor is such tilting movement of the mower head obstructed by the tractor or any parts thereon, since the drag arms are sufficiently long to position the head clear of the tractor. As shown in Fig. 2, the axis of the supporting trunnions on which the head swings relative to the drag frame is located in proximity to the plane of rotation of the front and rear wheels 2 and 3 at the mower side of the tractor. This location of the trunnion axis not only affords ample clearance between the mower head and the tractor, but also positions the mower head in such relation to the tractor that when cutting on a bank the tractor may run on level ground close to the bank while the cutter bar extends upwardly parallel to the inclined bank surface.

The mower head may also be tilted from the position in which it is shown in Fig. 3, so as to lower the outer end of the cutter bar through an angle of forty-five degrees, or more, such tilting movement being likewise not obstructed by the drag frame or any parts of the tractor. The total range of vertical swinging movement of the outer cutter bar end about the axis of the trunnions 29 and 31 relative to the drag frame is ample for all practical requirements, and the knife bar is reciprocated with a full cutting stroke throughout the range of said vertical swinging movement of the cutter bar.

The axis of break-back movement of the cutter bar, which is the axis of the ring joint 24, 39, swings with the head about the axis of the trunnions 29, 31, and when the cutter bar encounters an obstruction while working on an upward or downward incline, it is released with the same efficiency by the latch 81, as when it encounters an obstruction while working on level ground. In other words, the operation of the releasable latch mechanism 79, 81 is not affected by pivotal up or down adjustments of the cutter bar relative to the drag frame 16, 17 from the horizontal position of the cutter bar shown in Fig. 2.

In addition to the vertical tilting adjustment of the cutter bar about the axis of said trunnions 29 and 31, which has just been mentioned, the cutter bar may also be raised and lowered by swinging movement of the drag frame about the axis of its pivotal connection with the lower portion 14 of the bracket 12. The drag frame 16, 17 may be pivotally adjusted in the mentioned manner irrespective of whether the cutter bar extends horizontally or at an incline as shown in Fig. 1, without affecting or changing the throw of the knife bar, and without affecting the operation of the release mechanism 79, 81, as should be obvious from the foregoing discussions.

The mentioned adjustment of the drag arms 16 and 17 about their pivot center on the portion 14 of the bracket 12, and the pivotal adjustment of the mower head about the axis of the supporting trunnions 29 and 31 is preferably effected by power and, as shown in Figs. 1 and 2, this is accomplished by means of hydraulically operated rams.

A lifting ram for the drag arms 16 and 17 comprises a ram cylinder 129 the lower end of which is pivotally connected at 131 (Fig. 2), to the forward drag arm 16, the point 131 being spaced a suitable distance from the pivot center of the drag arm on the portion 14 of the bracket 12. A piston rod 132 extends upwardly from the ram cylinder 129 and is pivotally connected to the upper arm 13 of the bracket 12 at 133. The ram cylinder 129 is connected with a hydraulic control mechanism 134 on the tractor by a hose 136, and the ram comprising the cylinder 129 and the piston rod 132 is actuated in a conventional manner to raise and lower the drag arms 16 and 17.

Another hydraulic ram comprises a ram cylinder 137 and a reciprocable element including a piston rod 138, the second ram being provided to effect tilting adjustment of the mower head about the axis of the supporting trunnions 29 and 31. The ram cylinder 137 is mounted between the drag arms 16 and 17, on a hanger 135 which is pivotally mounted on the lower portion 14 of the bracket 12, the hanger 135 having a downwardly extending arm pivotally connected with the ram cylinder 137. The ram cylinder 137 rests loosely on a stop 139 carried by a bracket 143 which is secured to the web 18. The piston rod 138 of the tilting ram carries a sheave 141, and another sheave 142 is rotatably mounted on the bracket 143. A cable 144 is anchored at one end near the lower end of the bracket portion 14, the hanger 135 having another arm for fastening the cable 144 thereto. The cable 144 extends from the hanger 135 over the sheave 141 and is then trained around the sheave 142 from which it extends to an anchor pin 146 on the side plate 33 of the upper head section. The tilting ram cylinder 137 has another hose connection 140 with the hydraulic control mechanism 134 on the tractor and may be controlled independently of the lift ram for the drag frame. By admitting pressure fluid to the tilting ram cylinder 137 the piston rod 138 is forced outwardly and the resultant pull on the cable 144 causes the mower head to swing around the axis of the supporting trunnions 29 and 31 on the drag arms 16 and 17. On the other hand, by releasing fluid from the lift ram cylinder 137 the upper section of the mower head may be permitted to swing in a clockwise direction, as viewed in Fig. 2, about the axis of the supporting trunnions 29 and 31.

A pump 147 is mounted in front of the engine unit of the tractor as shown in Fig. 1, the pump being operatively connected with the crankshaft of the engine. Hose connections 148 place the pump 147 in communication with the control mechanism 134 on the tractor, the pump being effective to supply suitable hydraulic pressure for actuating the lifting ram for the drag arms 16 and 17 and the tilting ram for the mower head. Suitable control levers 149 and 151 for the hydraulic control mechanism 134 are arranged within reach from the driver's seat 152 on the tractor. By manipulation of one of the control levers 149 and 151 the lifting ram may be operated, and by manipulation of the other control lever the tilting ram may be operated. The lifting ram and the tilting ram may be operated independently of each other by manipulation of the control levers 149 and 151. By manipulation of the control lever for the lifting ram alone, the drag frame and the mower arm will be moved as a unit about the pivot center of the drag frame on the bracket portion 14, that is, about the axis of the auxiliary shaft 99. By manipulation of the control lever for the tilting ram alone, the mower arm is swung about the axis of the supporting trunnions 29 and 31 while the drag frame remains stationary relative to the tractor. The mower arm may be adjusted from a position in which it rests on the ground to an elevated position above the ground by first actuating the lifting ram, which raises the cutter bar above the ground and puts it at a slight upward inclination relative to the ground, and by then manipulating the tilting ram so as to position the mower arm parallel to the ground.

While in the foregoing a preferred embodiment of the invention has been shown and described, it should be understood that it is not intended to limit the invention to the exact details of construction herein disclosed for various modifications within the scope of the appended claims may occur to persons skilled in the art.

It is claimed and desired to secure by Letters Patent:

1. In combination with a tractor having a body and supporting wheels at opposite sides thereof, a drag frame mounted on said tractor body for vertical adjustment relative thereto and extending laterally therefrom, a cutter bar having an inner end laterally of said tractor, means connecting said cutter bar at said inner end thereof to a portion of said drag frame in proximity to the plane of rotation of one of said supporting wheels at the cutter bar side of the tractor for vertical angular movement of said cutter bar to raise and lower its outer end and for breakback movement of said cutter bar from a cutting position transversely of the tractor, a knife bar reciprocably mounted on said cutter bar, a drive element journaled in fixed position relative to said drag frame for rotary movement about an axis extending longitudinally of the tractor through the center of said vertical angular movement of said cutter bar, a bracket connected with said cutter bar for movement in unison therewith about the axis of said drive element, an arm mounted on said bracket for swinging movement relative thereto about a center spaced from the axis of said drive element, and means including said arm for driving said knife bar from said drive element with a full stroke of reciprocating movement in said cutting position of said cutter bar irrespective of the height to which its outer end has been moved by said vertical angular movement thereof.

2. In combination with a tractor having a body and supporting wheels at opposite sides thereof, a drag frame mounted on said tractor body for vertical adjustment relative thereto and extending laterally therefrom, a mower head comprising a first and a second section connected together for rotation relative to each other about a common axis, means connecting said first head section with a portion of said drag frame in proximity to the plane of rotation of one of said supporting wheels for swinging movement of said first head section relative to said drag frame about an axis extending lengthwise of said tractor and transversely of said common axis of said head sections, a cutter bar secured to said second head section, means including a locking mechanism releasable by said relative rotation of said head sections, for retaining said cutter bar in a cutting position transversely of said tractor, a knife bar reciprocably mounted on said cutter bar, an arm swingably mounted on said first head section, and means including said arm for transmitting a full stroke of reciprocating movement to said knife bar in said cutting position of said cutter bar irrespective of angular displacement of said cutter bar by said swinging movement of said first head section relative to said drag frame.

3. In combination with a tractor having a body and supporting wheels at opposite sides thereof, a drag frame mounted on said tractor body for vertical adjustment relative thereto and extending laterally therefrom, a mower head comprising a first and a second section connected together for rotation relative to each other about a common axis, means connecting said first head section with a portion of said drag frame in proximity to the plane of rotation of one of said supporting wheels for swinging movement of said first head section relative to said drag frame about about an axis extending lengthwise of said tractor and transversely of said common axis of said head sections, a cutter bar secured to said second head section, means including a locking mechanism releasable by said relative rotation of said head sections, for retaining said cutter bar in a cutting position transversely of said tractor, a knife bar reciprocably mounted on said cutter bar, a drive element journaled in fixed position relative to said drag frame for rotary movement about an axis in line with the axis of swinging movement of said first head section relative to said drag frame, an arm mounted on said first head section for swinging movement about a center in proximity to said common axis of said head sections and spaced from said axis of swinging movement of said first head section, means connecting said drive element with said arm for oscillating the latter by rotation of said drive element, and means connecting said arm with said knife bar for reciprocating the latter by oscillation of said arm.

4. In combination with a tractor having a body and supporting wheels at opposite sides thereof, a drag frame mounted on said tractor body for vertical adjustment relative thereto and extending laterally therefrom, a mower head comprising a first and a second section connected together for rotation relative to each other about a common axis, means connecting said first head section with a portion of said drag frame in proximity to the plane of rotation of one of said supporting wheels for swinging movement of said first head section relative to said drag frame about an axis extending lengthwise of said tractor and transversely of said common axis of said head sections, a cutter bar connected with said second head section for tilting adjustment relative thereto about an axis extending longitudinally of said cutter bar, means including a locking mechanism releasable by said relative rotation of said head sections for retaining said cutter bar in a cutting position transversely of said tractor, a knife bar reciprocably mounted on said cutter bar, and driving means for said knife bar accommodating said swinging movement of said first head section relative to said drag frame, said relative rotation of said head sections and said tilting adjustment of said cutter bar.

5. In a mower having a cutter bar and a knife bar reciprocable longitudinally of said cutter bar, the combination of a drag frame, a mower head comprising a first and a second section connected together for rotation relative to each other about a common axis, means connecting said first head section with said drag frame for swinging movement relative thereto about an axis extending substantially in the direction of propulsion of the mower and transversely of said common axis of said head sections, means connecting said cutter bar with said second head section for tilting adjustment relative thereto about an axis extending longitudinally of said cutter bar, means including a locking mechanism releasable by said relative rotation of said head sections, for retaining said cutter bar in a cutting position transversely of the direction of propulsion of the mower, a drive element journaled in fixed position relative to said drag frame for rotary movement about said axis of swinging movement of said first head section relative to said drag frame, an arm mounted on said first head section for swinging movement about a center in proximity to said common axis of said head sections and spaced from said axis of swinging movement of said first head section, means connecting said arm with said drive element for oscillating said arm by rotation of said drive element, and a link having a ball and socket connection at one end with said arm and another ball and socket connection at its other end with said knife bar.

6. In a mower, a first and a second head section, a ring joint comprising a pair of coaxial ring elements connected together for rotation relative to each other about their common axis and secured, respectively, to said head sections to form a passage therebetween axially of said ring joint, an arm movable within said passage relative to said head sections transversely of the axis of said ring joint, power actuated means operable to oscillate said arm transversely of the axis of said ring joint, a movable cutting element supportingly connected with one of said head sections, and a power transmitting connection between said arm and said cutting element.

7. In a mower, a first and a second head section, a ring joint connecting said head sections for rotation relative to each other and affording a passage therebetween axially of said ring joint, an arm extending into said passage, power actuated means on said first head section operable to oscillate said arm transversely of the axis of said ring joint, a reciprocable cutting element supportingly connected with said second head section, and a power transmitting connection between said arm and said cutting element for reciprocating the latter by said oscillatory movement of said arm.

8. In a mower, a first and a second head section, a ring joint connecting said head sections for rotation relative to each other and affording a passage therebetween axially of said ring joint, an arm extending through said passage, means on said first head section securing said arm at one end thereof to said first head section for oscillatory movement of the other end of said arm transversely of the axis of said ring joint about a center in proximity to said axis, power actuated means operable to oscillate said arm about said center, a reciprocable cutting element supportingly connected with said second head section, and a driving connection between said arm and said cutting element including a power transmitting element loosely connected to said other end of said arm.

9. In a mower, a first head section having a hollow supporting trunnion, a second head section, a ring joint connecting said head sections for relative rotation about an axis extending transversely of the axis of said trunnion, a rotatable drive shaft extending axially through said trunnion, an arm swingably secured to said first head section at one side of said ring joint and extending therethrough into said second head section, a power transmitting connection between said shaft and said arm for oscillating the latter about its center of swinging movement on said first head section, a reciprocable cutting element supportingly connected with said second head section, a link swingably secured to said arm at the other side of said ring joint, and means operatively connecting said link with said cutting element.

10. In a mower, a first and a second head section, a ring joint connecting said head sections for rotation relative to each other and affording a passage therebetween axially of said ring joint, a drive shaft, means retaining said drive shaft in angularly fixed position relative to said first head section for rotation about an axis extending transversely of the axis of said ring joint at one side of the latter, a reciprocable cutting element supportingly connected with said second head section at the other side of said ring joint, an arm pivoted on said first head section for swinging movement relative thereto about a center at said first side of said ring joint, means drivingly connecting said arm with said shaft to oscillate said arm about said center by rotation of said shaft, and a driving connection between said arm and said cutting element including a power transmitting element extending through said passage and operable by said arm to move back and forth within said passage transversely of the axis of said ring joint.

11. In a mower, a first and a second head section, a ring joint connecting said head sections for rotation relative to each other and affording a passage therebetween axially of said ring joint, a drive shaft, means retaining said drive shaft in angularly fixed position relative to said first head section for rotation about an axis extending transversely of the axis of said ring joint at one side of the latter, a cutter bar secured to said second head section at the other side of said ring joint for tilting adjustment about an axis extending longitudinally of said cutter bar, a knife bar reciprocably mounted on said cutter bar, an arm and a link having relatively adjacent ends connected by a first ball and socket joint, means connecting said arm with said first head section at said first side of said ring joint, for swinging movement about a center in proximity to the axis of said ring joint, a second ball and socket joint connecting said link with said knife bar in such a position that a line from said swinging center of said arm through the center of said first ball and socket joint to the center of said second ball and socket joint extends through said passage, and a driving connection between said drive shaft and said arm for oscillating said arm about said swinging center thereof by rotation of said drive shaft.

12. In a mower, a first and a second head section, a ring joint connecting said head sections for rotation relative to each other and affording a passage therebetween axially of said ring joint, an arm extending through said passage, means on said first head section cooperating with said arm to guide the latter for swinging movement in a plane extending, in angularly fixed relation to said first head section, through the axis of said ring joint, a reciprocable cutting element supportingly connected with said second head section, means positioning said cutting element for reciprocating movement longitudinally of said plane including a mechanism releasably locking said head sections against rotation relative to each other about the axis of said ring joint, and a power transmitting connection between said arm and said cutting element for reciprocating the latter by swinging movement of said arm, said power transmitting connection including a link secured to said arm for pivotal movement relative thereto so as to accommodate said relative rotation of said head sections upon release of said locking mechanism.

13. In a mower, a cutter bar having a shoe at one end, a lower head section bridging said shoe and having an aperture therein above said shoe, means connecting said lower head section with said shoe, an upper head section having a ring element cooperating with said lower head section to center said aperture of the latter on the axis of said ring element and to secure said lower head section to said upper head section for rotation relative thereto about said axis, said upper head section including a wall structure forming a hood over said aperture of said lower head section and having a pair of relatively spaced supporting trunnions alined on an axis extending transversely of the axis of said ring element, an arm within said hood swingably secured thereto on a center in proximity to the axis of said ring element and extending through the latter and said aperture of said lower head section, a rotatable shaft extending axially through one of said trunnions, a power transmitting connection within said hood between said shaft and said arm for oscillating the latter about said center, a knife bar mounted on said cutter bar for reciprocating movement longitudinally thereof, and a link swingably connected at one end to said arm at a portion thereof below said ring element and at its other end to said knife bar.

14. In a mower, a cutter bar having a shoe at one end, a lower head section bridging said shoe and having an aperture therein above said shoe, means connecting said shoe with said lower head section for tilting adjustment relative thereto about an axis extending longitudinally of said cutter bar, an upper head section having a ring element cooperating with said lower head section to center said aperture of the latter on the axis of said ring element and to secure said lower head section to said upper head section for rotation relative thereto about the axis of said ring element, said upper head section including a wall structure forming a hood over said aperture of said lower head section and having a pair of relatively spaced supporting trunnions alined on an axis extending transversely of the axis of said ring element, an arm within said hood swingably secured thereto on a center in proximity to the axis of said ring element and extending through the latter and said aperture of said lower head section, a rotatable shaft extending axially through one of said trunnions, a power transmitting connection within said hood between said shaft and said arm for oscillating the latter about said center, a knife bar mounted on said cutter bar for reciprocating movement longitudinally thereof, and a link having a ball and socket connection at one end with a portion of said arm below said ring element and another ball and socket connection with said knife bar.

BOYD S. OBERLINK.